April 5, 1960     J. A. HENDEL     2,931,391

HYDRAULIC DAMPER DEVICE

Filed Jan. 3, 1956

INVENTOR.
JOSEPH A. HENDEL
BY
HIS ATTORNEY

United States Patent Office 2,931,391
Patented Apr. 5, 1960

2,931,391
HYDRAULIC DAMPER DEVICE
Joseph A. Hendel, Ozone Park, N.Y.
Application January 3, 1956, Serial No. 557,146
1 Claim. (Cl. 138—26)

The present invention relates to a hydraulic shock absorber.

It is among the objects of the present invention to provide a novel hydraulic shock absorber which is generally useful in and around homes, offices, garages, loft buildings, factories, apartment houses, and the like, and which there may be a tendency for hydraulic shock to build up in a tubing or piping system.

Another object is to provide a novel water hammer eliminator for use in home or factory tubing installations where there is a likelihood of water hammer due to quick compression faucets, flushometers, reciprocating water pumps, quick closing valves on automatic washing machines.

Another object is to provide a novel hydraulic shock absorber which will be effective over a wide range of water pressure, and which will eliminate objectionable noises and harm to tubing at weak points, and which is particularly effective in eliminating shock due to loose piping or tankless water heaters.

A still further object is to provide a novel water hammer eliminator which may be readily installed, is devoid of movng parts, which may be positioned at the end of a line or in the middle of the line, and which will not require servicing.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory to provide a water hammer eliminator consisting of concentric coils of thin flexible copper tubing in which such coils are closely spaced with both radial and longitudinal clearance, and so arranged that the individual coils will normally receive both water and air regardless of the position in which they may be mounted.

Although the coils may be round, they are generally desirably flattened so that their maximum width may be in the direction of longitudinal axis of the device and desirably at least two or three layers of concentric coils are provided with the inner spiral being substantially greater in length by one or two coils than the outer spiral.

Desirably one end of the coil in the outer spiral remote from the inlet of the coil is sealed to terminate the coils, while the other end has a nipple or threaded nut connection which may be mounted into a T or another junction of a plumbing line desirably close to where the water shock tends to arise.

Desirably the inlet consists of a straight axial longitudinal tubular member which passes centrally and interiorly of the double or triple spiral and which is joined to the inner spiral diametrically opposite the end of the outer coil and at the same end of the multiple spiral combination.

Generally, the size of the coils may range from 5/16" to 3/8" in width and about 2/8" to 5/16" in thickness with a wall diameter of about 1/64" to 1/32".

Desirably the outer spirals are flatter than the inner spirals, so that the maximum flattening will occur in the outside concentric portion. The length of the tubular spiral will range from 4" to 7" with an optimum of 5" to 6".

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views.

Figure 1:
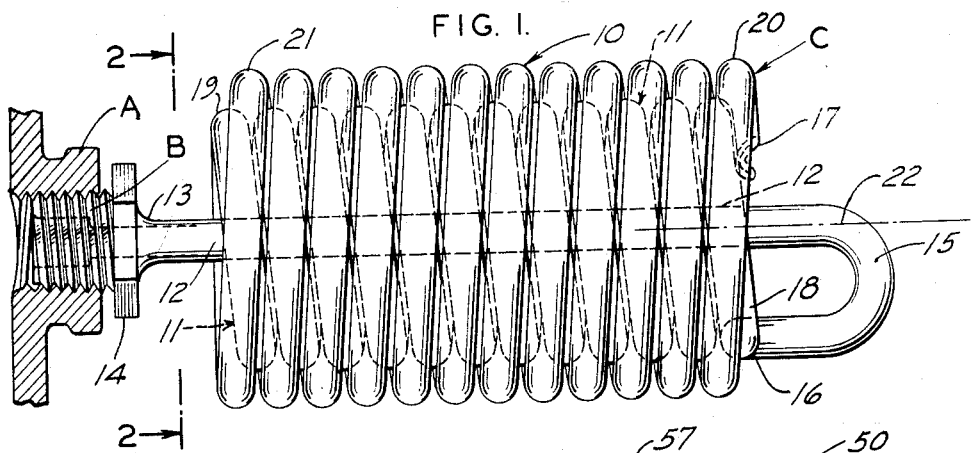
Fig. 1 is a side elevational view showing one form of the present invention with a double concentric spiral arrangement.

Referring to Fig. 1 there is shown a mounted tubing fitting A which may consist of a stem of a T, together with a mounted threaded nut B, for the water hammer eliminator coil C.

The coil C has an outer spiral 10 and an inner spiral 11 with a central axial longitudinal inlet tube 12.

This tube is joined at the end 13 with the hexagon head 14 of the nut B.

At its other end, it has a semi-circular connection 15 to the end 16 of the inner coil 11.

In diametrically opposite position, the outer coil 10 is sealed at 17. If desired, the connection at 16 may be made to the outer tube and the end of the inner tube might then be sealed as at 17.

The inner spiral has the outside or end coils 18 at the far end and 19 at the adjacent end, which desirably project beyond the far coil 20 and the adjacent coil 21 of the outer spiral 10.

As shown, there are 12 turns in the outer coil 10 and 12 turns in the inner coil 11, but desirably the inner coil may have one or two turns in addition to the number of turns of the outer coil 10, so that it will project a substantial distance beyond the outer coil 10.

Figure 2:
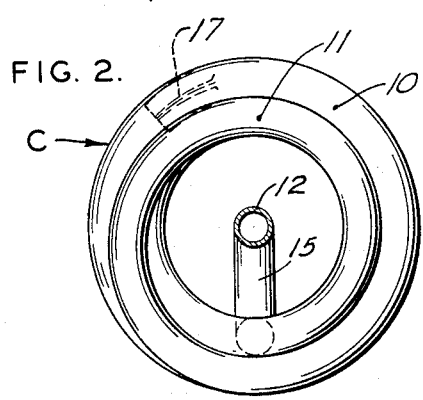
Fig. 2 is a transverse sectional view upon the line 2—2 of Fig. 1.

Desirably the device of Figs. 1 and 2 are positioned horizontally in connection with the tubing line and in the preferred construction the portion of the coil about the dotted line 22, indicating the axis is 1/2 to 1/3 or wholly filled with air, this will give a maximum of elimination of water hammer.

Figure 4:
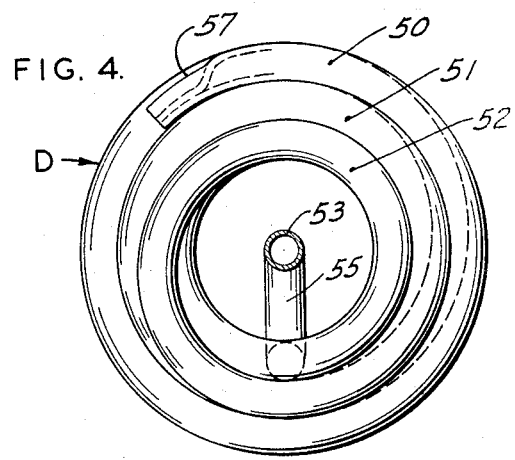
Fig. 4 is a transverse sectional view upon the line 4—4 of Fig. 3.
Figure 3:
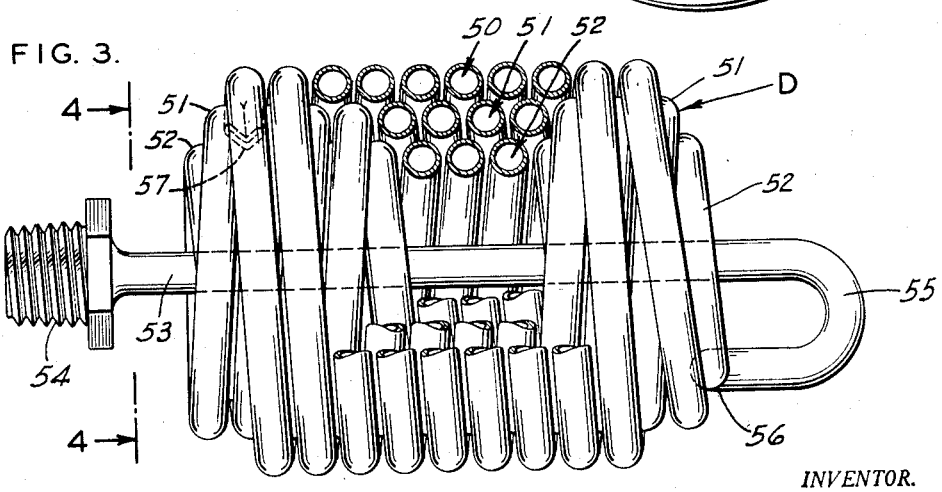
Fig. 3 is a side elevational view partly in section of an alternative triple spiral construction with three concentric spirals arranged one inside of the other.

In the embodiment of Figs. 3 and 4, there is shown a triple spiral D having an outer coil 50, an intermediate coil 51 and an inside coil 52.

The central connection 53 leads from a threaded nut mounting 54 to the semi-circular end piece 55, which connects at 56 to the inside coil 52.

This coil 52 projects beyond the coils 50 and 51. The outer coil 50 at a point diametrically opposite the junction 56 and at the opposite end of the coil D is sealed, as indicated at 57.

In the embodiment of Figs. 3 and 4, the tubing may be increasingly flattened from the center of the coil to the outside of the coil and the spiral tubing may be of varying length from the center of the coil to the outside of the coil.

Figure 5:
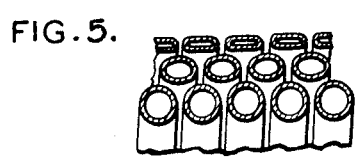
Fig. 5 is a fragmentary detail view showing the sectional tube construction.

It will be noted in Fig. 3 that the inside spirals are longer than the outside spirals while in Fig. 1 the inside and outside spirals are of the same length. Furthermore, the innermost spiral 52 may have its cross section flattened or elliptical parallel to the direction of the axis of the device with the amount of flattening increasing from the center of the triple coil to the outside of the triple coil as shown in Fig. 5.

The triple coil arrangement of Figs. 3 and 4 is particularly designed to absorb shock in water pipes caused by build up of pressure when water escape is suddenly cut off. This is quite prevalent where there are quick compression faucets or flushometers, or any other suddenly closing valve arrangement.

The device of the present invention is adaptable to ordinary pressure ranging from 35 lbs. to 40 lbs. and will accommodate pressure built up to 450 lbs.

This eliminates the shock and noise due to sudden closure or cessation of water flow and will prevent harm at the weak connections, and it is particularly suitable for use in connection with tankless water heaters.

It may be made of varying sizes from 3" to 5" in diameter and 7" to 9" in length. It should be installed in horizontal positions with end loop 15 or 55 down near the faucet or valve, which causes the shock.

It particularly should be mounted to a tankless water heater or a water line for hot water.

The device is easy to install, has no moving parts, will not require servicing, and affords a most simple and effective device for eliminating water hammer.

As many changes could be made in the above hydraulic damper device and many widely different embodiments of this invention could be made without departing from the scope of the claim, it is intended that all matter contained in the above description shall be interpreted as illustrative and not in a limiting sense.

Having now particularly described and ascertained the nature of the invention, and in what manner the same is to be performed, what is claimed is:

A hydraulic shock absorber for a water system to eliminate water hammer in home and factory plumbing installations comprising a plurality of closely spaced concentric cylindrically arranged spiral coils formed of a unitary length of thin flexible copper tubing, said coils being positioned in parallel relation inside of one another and having a common central longitudinally extending axis and said coils being positioned so that their common axis will be horizontal and so that the inclination of successive coils is opposite in each adjacent coil as one proceeds from and to the axis from coil to coil, said coils being flattened so that the cross sections will be greater in the direction of the axis than in a direction transverse to the axis, the coils also being of successively decreasing length from the axis toward the exterior, one end of the tubing forming the coils being sealed to terminate the coil and the other end of the tubing forming the coils being provided with a threaded inlet connection adapted to connect the coils to a plumbing installation, the said inlet connection being at the axis and extending beyond the length of the coils and being connected to the innermost coil at the end opposite the sealed end of the outermost coil and having an integral semi-circular tubular member connected to the innermost coil and extending beyond the coils at a point remote from said threaded inlet, the adjacent turns of each of said concentric spiral coils being closely spaced with respect to each other in a longitudinal direction and each concentric coil being spaced from an adjacent concentric coil and the turns of each concentric coil being positioned opposite the gaps of the next adjacent concentric coil.

References Cited in the file of this patent

UNITED STATES PATENTS

| | | |
|---|---|---|
| 2,407,276 | Hendel et al. | Sept. 10, 1946 |
| 2,730,132 | Marcus et al. | Jan. 10, 1956 |